March 22, 1932.　　C. B. MILLS ET AL　　1,850,598
SEARCHLIGHT CONTROL
Filed June 7, 1924　　2 Sheets-Sheet 1
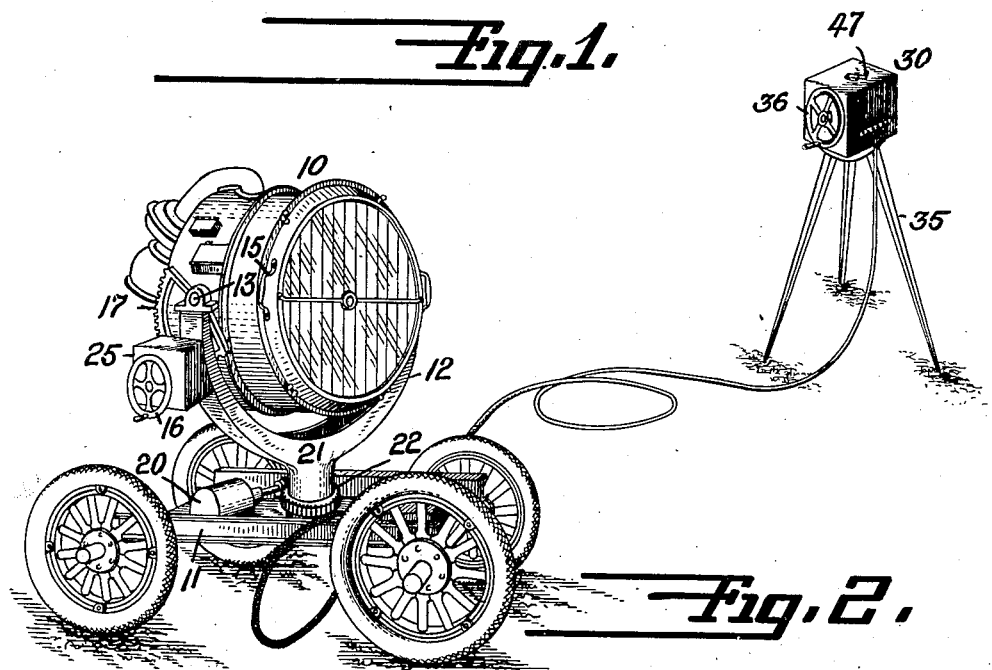
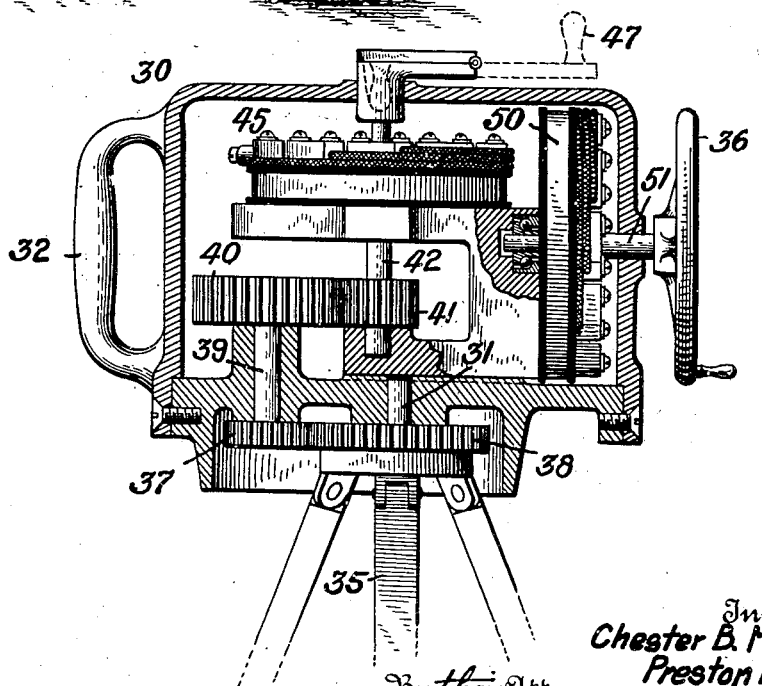
Inventor
Chester B. Mills and
Preston R. Bassett.
By their Attorney
Herbert H. Thompson March 22, 1932.                C. B. MILLS ET AL              1,850,598
                                SEARCHLIGHT CONTROL
                               Filed June 7, 1924         2 Sheets-Sheet 2
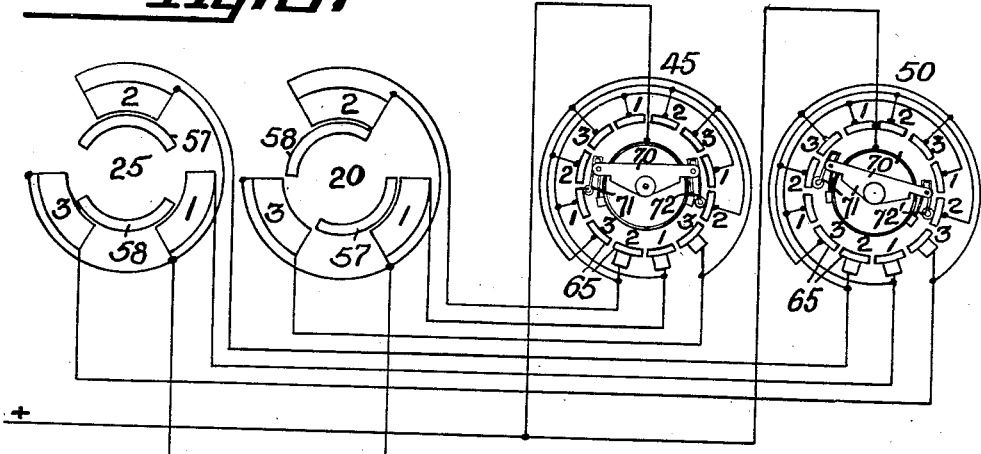
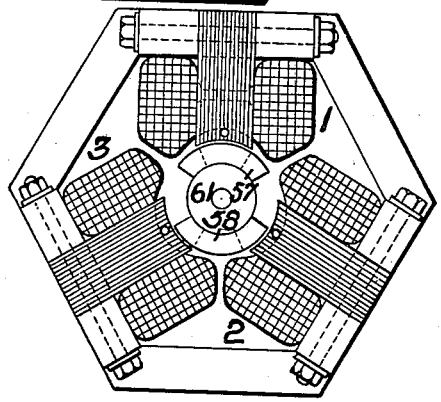
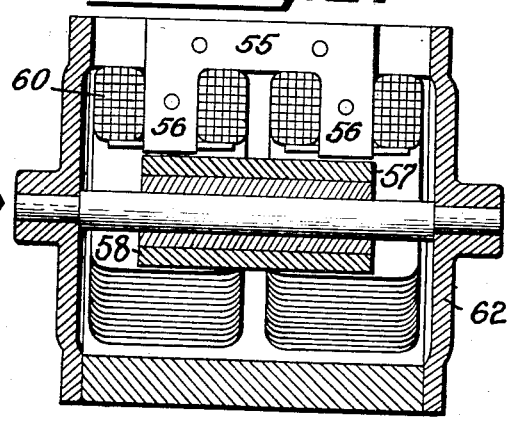
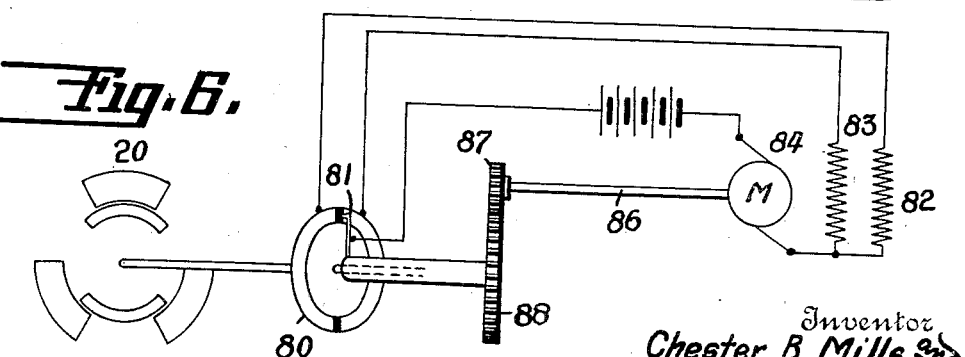
Inventor
Chester B. Mills and
Preston R. Bassett.
By their Attorney
Herbert H. Thompson Patented Mar. 22, 1932

1,850,598

UNITED STATES PATENT OFFICE

CHESTER B. MILLS AND PRESTON R. BASSETT, OF BROOKLYN, NEW YORK, ASSIGNORS, BY MESNE ASSIGNMENTS, TO SPERRY GYROSCOPE COMPANY, INC., OF BROOKLYN, NEW YORK, A CORPORATION OF NEW YORK

SEARCHLIGHT CONTROL

Application filed June 7, 1924. Serial No. 718,625.

This invention relates to distant control devices which may be utilized for controlling various objects at a distance from the operating station, but which are particularly adapted for the control of searchlights, especially in anti-aircraft operation where quick and accurate movements are essential. The desirability of such a system is well known and various systems for distant control have been evolved, but in every case such control consisted primarily of a contact-closer to the operating station which rendered an operating motor effective at the searchlight to drive the searchlight continuously until the circuit was broken. By this system it was impossible for the operator properly to gauge the amount of movement of the searchlight because he could only judge the angular distance through which the light probably moved by the length of time the contacts were closed. This required skill and practice on the part of an operator in order to translate the time factor into angular movements at a remote point.

One of the essentials to the success of a distant electrical control for searchlights, especially in anti-aircraft work, is the naturalness with which the beam is made to obey the operator's directive actions or in other words to follow his line of sight. The most natural way to accomplish this is to simulate at the controller the same conditions that the operator would have if standing at his light and pointing it by turning it directly. This forms one of the principal objects of the present invention, that is, to provide means whereby the relative position of the operator to the controller is the same as would be his position relative to the light itself when operating the light directly and to provide means whereby the movements of the controller simulate and are in exact synchronism with the movements of the light itself, or, stating it another way, the movements of the searchlight simulate the movements of the controller. The controller, therefore, really follows the line of sight of the operator in the same manner that the searchlight beam does, resolving it into a component in azimuth and in a component in elevation, so that the system lends itself excellently to a direct control from a sighting means.

It has hereinbefore been stated that in prior constructions for distant electrical control of a movable object, such as a searchlight, there have been provided operating motors adapted to run continuously once the circuit was closed by the operator. It is another object of my invention to employ as the operating member a step-by-step repeater motor actuated from a transmitter on the controller so that each step of the controller may be transmitter to the repeater motor to cause the latter to actuate the searchlight through one step. By making the ratio of movement between the controller and the searchlight 1 to 1, the positions of the controller and searchlight will always correspond after the initial synchronization. The step-by-step motor operated from a transmitter, means a more certain action and simplification of the electrical connections between the control station and the controlled element, and a fineness of movement of the controlled element not possible in structures of the type heretofore employed.

Further objects and advantages of this invention will become apparent as the detailed description of the invention proceeds.

In the accompanying drawings

Fig. 1 is a perspective view showing a searchlight and the control element, and the distant electrical control mechanism therefor.

Fig. 2 is a vertical section through the control mechanism showing the controllers.

Fig. 3 is a wiring diagram showing the connections between the transmitters and their respective repeater motors.

Fig. 4 is an end view of a repeater motor.

Fig. 5 is a vertical section through the Fig. 4 device.

Fig. 6 is a diagrammatic representation of a modification.

Referring to the drawings, there is shown in Fig. 1, a searchlight 10, in this case shown as a portable type, mounted upon a truck or chassis 11 within a supporting frame 12. The searchlight is mounted for movement in said frame about a horizontal axis 13, and said frame is mounted on said chassis for movement about a vertical axis.

If the searchlight were adapted to be moved by hand, the operator would stand behind the light or at one side thereof and by grasping a handle at the side, such as handle 15, or a handle at the rear of the drum and by walking around the fixed base, would swing the light in azimuth to the desired position. Similarly, in order to operate the light in a vertical direction, the operator would rotate handle 16 upon the shaft of which is fixed a pinion meshing with a segmental rack 17 on a trunnion of the searchlight casing. So that to whatever position the light may be turned, the operator always maintains the same position relative thereto.

When the searchlight is to be controlled by a distant controller there is provided a motor 20 geared by a worm 21 to a horizontal annular rack 22 fixed to the frame 12 for operating the searchlight about its vertical axis, and a motor 25 for operating the shaft upon which wheel 16 is mounted to swing the light in a vertical plane, said motors being controlled from a distance by the control mechanism 30.

For controlling said motors we preferably construct a control mechanism such that its movements are exactly like those of the searchlight 10 and such that the operator maintains the same position relative to the controller that he would maintain relative to the searchlight itself if he were operating said searchlight directly. For this purpose, my controller comprises a casing 30 mounted upon a vertical pivot 31 for movement about a vertical axis. The operator takes up the same relative position with respect to the casing 30 that he would take up with respect to the searchlight itself, and by grasping a handle 32 and walking around the fixed support 35, he is enabled, by the means hereinafter to be described, to swing the searchlight casing 10 exactly as he swings the casing 30. That is, the final ratio of movement between said casing 30 and said searchlight 10 is 1 to 1. Similarly, should the operator desire to raise the searchlight in a vertical plane, he operates a wheel 36 projecting through the side of the casing in the same manner that wheel 16 projects out of the side of searchlight drum 10 and by the means to be hereinafter described, the searchlight 10 is moved by said wheel 36 in exactly the same degree as it would be by movements of wheel 16. Preferably, the ratio of movement between control wheel 36 and control wheel 16 is also 1 to 1. It is thus apparent that so far as the operator is concerned, he need not be aware of the fact that he is operating a control mechanism rather than the searchlight itself, for his relation to said mechanism and the movements thereof are exactly the same as if he were positioned at the light itself.

For effecting the movement of the light in azimuth from the controller, said casing 30 may be provided with a gear 37 meshing with a fixed rack 38 on the upper end of the support 35, which, in this case, is shown in the form of a tripod to be utilized in connection with the portable type searchlight shown, so that it may be set up in any convenient position. The gear 37 is fixed to a shaft 39 carrying at its other end a gear 40 meshing with a gear 41 on a shaft 42 of a transmitter 45. The motor 20 for operating the searchlight in azimuth is as shown in Figs. 3 to 5 a step-by-step motor rather than a continuously rotating motor, as was heretofore employed and the advantages of utilizing a step-by-step motor have been hereinbefore set forth. In order to make the steps of said motor of the desired fineness, the gearing between support 35 and the transmitter shaft 42 may be any suitable multiplication factor, such as 90 to 1 or 180 to 1. The gearing shown is 90 to 1, that is, for each complete revolution of casing 30 about its support 35, gear 41 and hence the transmitter shaft 42 will be rotated through 90 complete revolutions. Each complete revolution of the transmitter shaft 42 corresponds therefore to 4 degrees of movement of the casing 30 and if, as will be hereinafter described, there are 24 steps of the repeater motor for each complete revolution of the transmitter shaft 42, then each step of the repeater motor corresponds to 1/6 of a degree or 10 minutes. There is thus obtained a very fine movement of the light and yet each step is definite. The motor 20 is, of course, geared to the light in the reverse ratio, that is, 1 to 90, so that the ratio of movement of casing 10 to casing 30 is 1 to 1. When the light is to be moved in very slow increments, the shaft 42 may be operated directly instead of through the multiplying gearing by a handle 47 projecting out of the top of casing 30 and fixed to the opposite end of said shaft 42, said handle thus constituting a vernier or fine adjustment. When not in use, the handle may be folded upon itself as shown in Fig. 2.

For operating the searchlight casing 10 in a vertical plane, there is provided the motor 25 which is also a step-by-step motor and operated from a transmitter 50 within casing 30, said transmitter being operated either directly by handle 36 fixed to the transmitter shaft 51 or through suitable multiplying gearing to obtain a greater fineness of movement. Such gearing is not absolutely essential, however, for the same result is accomplished by suitably proportioning gear 17 and the pinion meshing therewith. The operation of the light in a vertical plane will thus be obvious.

It will now be apparent that the movement of the controller in azimuth and the movement of handle 36 in a vertical plane correspond exactly to the movement of the searchlight in azimuth and the movement of the control member or wheel 16 in a vertical plane by an operator positioned directly at the light. If the initial position of the controller is made to correspond to the initial position of the searchlight 10, then the operator will actuate the controller exactly as he would operate the searchlight itself. The searchlight beam will always project in front of him as it would if he were stationed at the side or to the rear of the light itself and said beam will respond to his movements in azimuth or the actuation of wheel 36 in a vertical plane in the same manner as if he were at the light. Thus it requires no experience or practice to operate this control for the operator does merely the obvious movements which he would do in operating the light directly.

In Figs. 3 to 5, we have illustrated the transmission system which we here employ, showing a novel and powerful repeater motor and controlling transmitter therefor. In the ordinary step-by-step repeater motor, it was usual to employ a plurality of pairs of poles and an armature composed entirely of magnetic material so that the flux passed entirely through said armature between the field poles. This necessitated first a continual reversal of the direction of magnetic flux through the armature and, second, an armature composed entirely of magnetic material, usually iron, and of relatively great weight. Both of these factors prevented high speed operation of the repeater motor and hence limited the torque of said motor and the force which could be operated thereby. The step-by-step motor, which I here employ, comprises a plurality of field poles 55 preferably in the shape of a U the arms 56 extending inwardly into proximity with the armature poles 57, 58 and being each surrounded by an energizing field coil 60. In the present instance, we have shown three field poles, but it will be understood that the number of field poles may be varied. Instead of directing the magnetic flux traversely through the armature, we provide for passing said flux axially along said armature to form the closing member between the arms of the field poles so that a circuit is established through the field poles and axially along said armature, thus obviating the necessity of employing an armature composed entirely of magnetic material and further obviating the necessity of reversing the flux through said armature. For this purpose, the armature may comprise a core 61 of light non-magnetic material, such as aluminum, said core being journaled in the casing 62 of the repeater motor and the armature poles comprising merely magnetic strips, in this case two, attached to said core axially on the surface thereof.

For controlling the repeater motor, we have shown a transmitter comprising a plurality of sets of contacts 65, each set comprising three contacts 1, 2, 3 joined respectively to the coils of the three field poles also marked 1, 2, 3 to correspond to said contacts, like contacts of each set being joined together. In this instance I have shown four sets, so that as the trolley member 70 makes a complete revolution, it will cause four revolutions of the repeater motor. A similar transmitter having similar contacts and a trolley member 70' may be provided for actuating motor 25. The trolley members 70, 70' each comprise a pair of trolleys 71, 72 and 71', 72' which are disposed 180° less one half contact apart. Like contacts of each second set are disposed 180° apart, that is, diametrically opposite, so that by positioning the trolley contacts with respect to one another 180° less one half contact apart, said trolleys will, during one step, engage similar contacts of opposite sets of contacts and during the next step one trolley will engage the same contact while the other trolley will have moved to the succeeding contact to energize two adjacent field coils. Thus, for example, as shown in Fig. 3, trolley member 70 has one trolley 71 positioned on contact 1 of one set while the other trolley 72 is positioned on contact 2 of the diametrically opposite set, so that field coils 1 and 2 of motor 20 are energized to attract the respective armature poles to the same extent and position the armature as shown. In the next step, rotating the trolley member 70 clockwise, said trolley member will assume the position in which trolley member 70' is shown, i. e., trolley 71 engages contact 2 while the other trolley 72 remains on contact 2 of the diametrically opposite set, so that only field coil 2 is energized and the armature is moved in a counter-clockwise direction (in this case, through 30° or $\frac{1}{12}$ revolution) directly opposite field coil 2 to the position shown in motor 25 in Fig. 3. Thus the field coils of the motors are energized during continuous rotation of the transmitter trolleys in the same direction through the following steps: 1, 1+2, 2, 2+3, 3, 3+1, 1, these steps producing one-half revolution of the armature in accordance with the known principle of operation of such motors, i. e., the number of steps per revolution is equal to twice the number of field poles times the number of armature poles. In this case there will be twelve steps. In one complete revolution of the transmitter the armatures of the step-by-step repeater motors will make two complete revolutions for a total of twenty-four steps. It will be understood that the number of transmitter contacts may be varied just as the number of field poles of the motor may be varied. In order to obtain a 1 to 1 ratio of movement between wheels 36 and 16 if the repeater motor makes two revolutions to one of the transmitter, then the gearing between wheel 16 and the repeater motor is also assumed to be in the ratio of 2 to 1.

If it is not desired to have the repeater motors operate directly on the searchlight, said motors may control a relay which in turn controls a more powerful, continuously operating type of motor. Thus, in Fig. 6, the repeater motor 20 is shown controlling one member 80 of a relay, said member being in the form of a split ring having the parts thereof insulated from each other. The trolley 81 normally rests upon an insulated strip, but upon movement of member 80 closes the circuit through field 82 or 83 of reversible motor 84, depending upon the direction of movement of said member. Motor 84 is geared to the light and will continue to operate until said motor rotates trolley 81 back to the insulation strip by means such as follow-up connection 86 and gears 87 and 88. In this way a much more powerful torque can be obtained than by gearing the repeater motor directly to the searchlight. Motor 84 is herein termed a continuous-running motor to distinguish it from the repeater motor and to designate an ordinary type motor.

In accordance with the provisions of the patent statutes we have herein described the principle and operation of my invention, together with the apparatus which we now consider to represent the best embodiment thereof, but we desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having herein described our invention, what we claim and desire to secure by Letters Patent is:

1. In combination, a searchlight adapted to be moved, means for moving said searchlight, and a distant control for said means including a transmitter, a casing therefor, and a relatively movable control member, means whereby movement of the casing actuates said transmitter to move said searchlight at a one-to-one ratio, and means for actuating said transmitter through smaller steps than by said casing to transmit finer movements to said searchlight.

2. In a distant control for searchlights and the like, a step-by-step repeater motor comprising a plurality of field poles and armatures, and a distant-control mechanism therefor, including a transmitter having a plurality of sets of contacts, each set of contacts being connected respectively with the field poles, said transmitter having a trolley adapted to engage the contacts of each set in succession so that said field poles are energized a plurality of times for each revolution of said trolley.

3. In a distant control for searchlights and the like, a step-by-step repeater motor comprising a plurality of field poles and armatures, and a distant-control mechanism therefor, including a transmitter having a plurality of sets of contacts, each set of contacts being connected respectively with the field poles, the contacts of each set being disposed diametrically opposite like contacts of another of said sets, a trolley member adapted to make two steps for each contact and comprising a pair of trolleys disposed 180° less one-half contact apart.

4. In a distant control for searchlights and the like, a step-by-step repeater motor comprising a plurality of field poles and armatures, and a distant-control mechanism therefor, including a transmitter having a plurality of sets of contacts, each set of contacts being connected respectively with the field poles, like contacts of each set being electrically interconnected, the contacts of each set being disposed diametrically opposite like contacts of another of said sets, a trolley member adapted to make two steps for each contact and comprising a pair of trolleys disposed 180° less one half contact apart.

5. In combination with a searchlight and the like, motors for actuating said searchlight in azimuth and in elevation, a controller for the distant control of said motors, comprising a housing mounted for rotation about a vertical axis, a grip for rotating the same, a transmitter within said housing and rotated thereby to control said azimuth motor, planetary gearing within said housing for rotating said transmitter by the turning thereof, at a greater rate than the rate of turn of said housing, reduction gearing between said searchlight and its azimuth motor such that the searchlight is turned at a one-to-one ratio with said housing, an auxiliary handle for turning said transmitter at a slower rate, a second transmitter within said housing to control said elevation motor, and a separate handle for turning said second transmitter, said last-named handle being rotatable in a vertical plane and bodily revoluble in azimuth within said housing.

6. In combination with a searchlight and the like, motors for actuating said searchlight in azimuth and in elevation, a controller for the distant control of said motors, comprising a housing mounted for rotation about a vertical axis, a grip for rotating the same, a transmitter within said housing and rotated thereby to control said azimuth motor, planetary gearing within said housing for rotating said transmitter by the turning of said housing, alternative means for turning said transmitter directly, a second transmitter within said housing to control said elevation motor, and a separate handle for turning said second transmitter, said last-named handle being rotatable in a vertical plane and bodily revoluble in azimuth within said housing.

In testimony whereof we have affixed our signatures.

CHESTER B. MILLS.
PRESTON R. BASSETT.